United States Patent [19]
Omori

[11] 4,214,858
[45] Jul. 29, 1980

[54] INJECTION APPARATUS

[75] Inventor: Kazumitsu Omori, Handa, Japan

[73] Assignee: Kabushiki Kaisha Meiki Seisakusho, Aichi, Japan

[21] Appl. No.: 46,001

[22] Filed: Jun. 4, 1979

[30] Foreign Application Priority Data

Jun. 15, 1978 [JP] Japan ................................. 53-72750

[51] Int. Cl.² ............................................. B29F 1/06
[52] U.S. Cl. .................................... 425/145; 425/149
[58] Field of Search ............... 425/145, 149, 156, 157, 425/167

[56] References Cited

U.S. PATENT DOCUMENTS

| | | | |
|---|---|---|---|
| 3,659,974 | 5/1972 | Neugroschl | 425/29 |
| 3,893,792 | 7/1975 | Laczko | 425/149 |
| 4,120,631 | 10/1978 | Leutner et al. | 425/145 |
| 4,161,380 | 7/1979 | Bishop | 425/145 |

*Primary Examiner*—J. Howard Flint, Jr.
*Attorney, Agent, or Firm*—Browdy and Neimark

[57] ABSTRACT

An injection apparatus provides for monitoring system a comprising a means comparing a peak pressure in a hydraulic cylinder during injection and a time from a moment of injection start to a moment of occurrence of said peak pressure with a respectively predetermined value.

3 Claims, 3 Drawing Figures

INJECTION APPARATUS

FIELD OF THE INVENTION

This invention relates to an injection apparatus more particularly to a monitoring system for an injection apparatus whereby molded article are made uniform in quality.

BACKGROUND OF INVENTION

In the art of invention molding, various control systems and monitoring systems are used in order to achieve more desirably molded article. Injection molding machines are usually of reciprocating screw type by which the material to be molded is plasticized through the application of heat and the mechanical working of the material by the rotation of a screw within a plasticizing chamber. When enough plasticized material has been accumulated, the screw which is joined with a ram of a piston in a hydraulic cylinder advances toward a nozzle orifice by pressure exerted on the piston in the hydraulic cylinder and injects the plasticized material into a mold cavity. It is a fundamental art of injection molding to control injection pressure, injection velocity, viscosity of the plasticized material which has relation to temperature of a heating barrel, back pressure of a screw and rotation speed of a screw during plasticizing, in a predetermined value. Many systems to control these factors have been invented. U.S. Pat. No. 3,642,404 and U.K. Pat. No. 1,296,029 also relate to a control system of an injection molding, of which the invention provides a device which detects a molding filling moment by differentiating an injection pressure value P with a differential time, or the differentiated value dP/dT and a control system which changes an injection pressure for accumulating the plasticized material into a mold cavity to a lower holding pressure than said injection pressure. Concerning monitoring system, a monitoring device in the prior art watches the fluctuation of injection pressure and injection velocity, and temperature of a heating barrel respectively. In monitoring system, it is essential to select some effective monitoring factor in order to mold the good quality and uniformity of the articles. FIG. 1 thereof, an oscillograph of a hydraulic pressure in a hydraulic cylinder chamber is shown. As coldness of a narrow gate portion of mold cavity in early time of injection causes viscosity of melted material to increase, the hydraulic pressure in the hydraulic cylinder chamber increases. An then the narrow gate portion being heated soon, the hydraulic pressure decreases slightly. Consequently a peak pressure P1 in the hydraulic cylinder chamber occurres at the time T1 as shown in FIG. 1. When melted material is filled in the mold cavity, the hydraulic pressure is changed to a holding pressure, which is kept to a lower pressure during predetermined time than the pressure during injection. Significance of the peak pressure is very important, because a change of hydraulic pressure in the hydraulic cylinder, a injection speed, a viscocity of melted material has effect on a time from a moment of injection start to a occurence of peak pressure and the pressure at the moment of occurrence.

It is an object of the present invention to provide effective factors for a monitoring system.

Another object of this invention is to provide an improved injection apparatus having a monitoring system detecting a peak pressure in the hydraulic cylinder and measuring a time from a moment of injection start to a moment of occurrence of said peak pressure.

SUMMARY OF THE INVENTION

Briefly stated, in accordance with one aspect of the present invention, a monitoring system for detecting an abnormal condition of an injection molding machine is provided and includes a means for detecting a peak of hydraulic pressure in the hydraulic cylinder and means for measuring a time from a moment of injection start to a moment of occurrence of said peak pressure and also means for comparing said pressure and said time with respectively predetermined pressure and time.

DESCRIPTION OF PREFERRED EMBODIMENT

Figure 2:
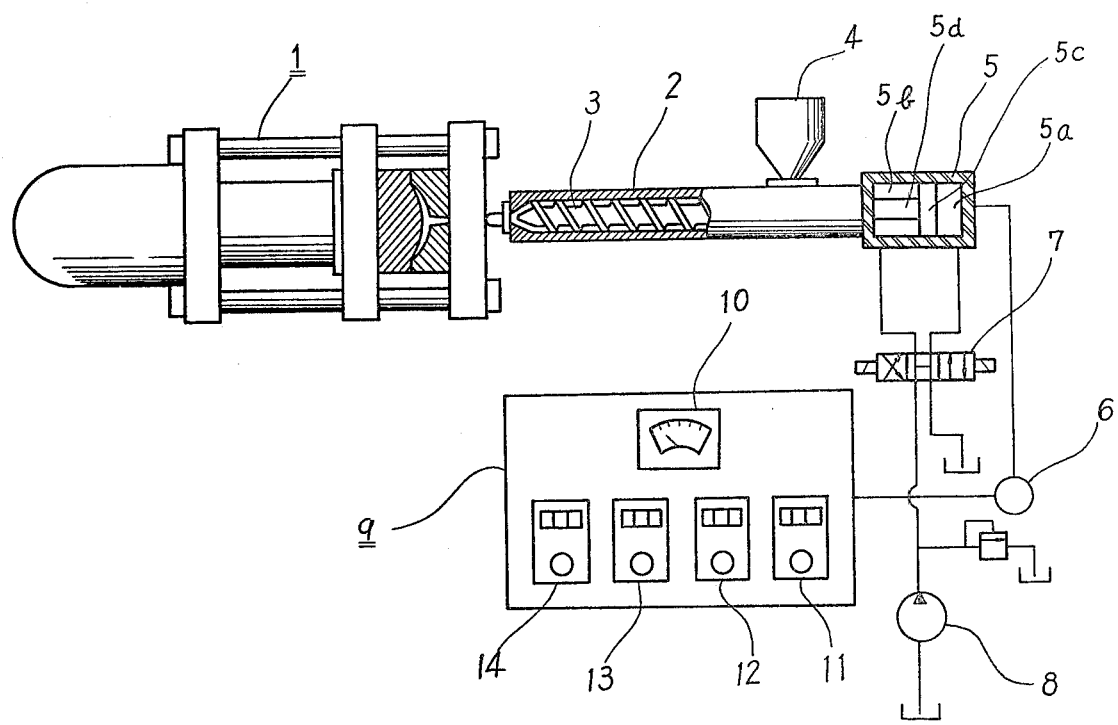
FIG. 2 is a schematic view a portion of an injection unit and a clamping unit of an injection molding machine.
Figure 1:
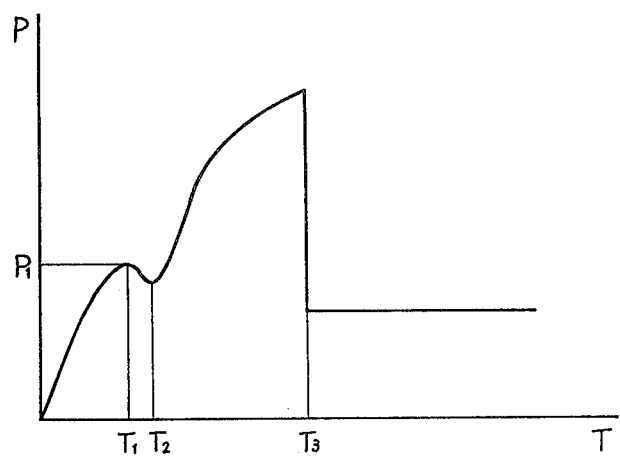
FIG. 1 is a graph showing an relation between hydraulic pressure and time during injection.
Figure 3:
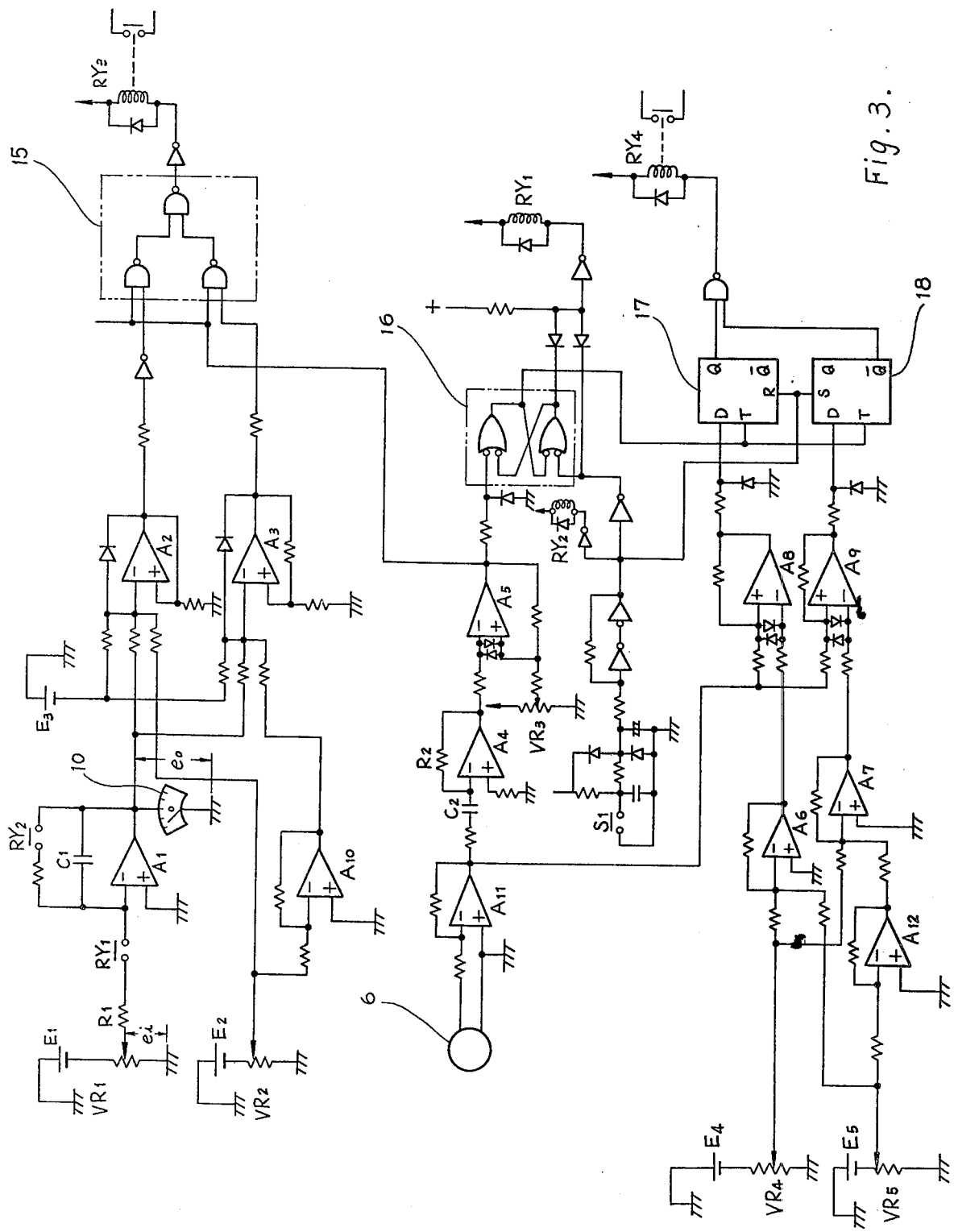
FIG. 3 is a schematic circuit of a control circuit incorporating the principles of this invention.

Referring to FIG. 2 thereof, there are a portion of a clamping unit and an injection unit of an injection molding machine. The material to be plasticized is placed in a hopper 4 which is fixedly mounted on a heating barrel 2. The screw 3 which is joined with a ram 5d in a hydraulic cylinder 5 is selectively bidirectionally and axially movable within the heating barrel 2 by a hydraulic piston 5c fixedly secured to the ram 5d. The piston 5c is slidably movable in a hydraulic cylinder 5. The hydraulic cylinder 5 is divided into two variable size hydraulic cylinder chamber 5a and 5b by the movable piston 5c. Rotation of the screw 3 is obtained by a hydraulic motor not shown in the drawing. The pressure of the hydraulic cylinder chamber 5a is sensed by a pressure transducer 6. A four way valve 7 is on a conduit pipe connected between an oil pump 8 and the hydraulic cylinder 5 and on the conduit pipe connected between the hydraulic cylinder 5 and an oil reservoir. An electric control box 9 includes an electric circuit shown in FIG. 3. A voltage meter 10 and four dials 11, 12, 13 and 14 are provided on front panel of the electric control box 9. Referring FIG. 3 thereof, an integrating circuit composed of resistor R1 a condenser C1, and an amplifier A1 is provided in a circuit. The relation between a voltage eo and ei is given as a formula, $eo = (-1/C1R1) \int ei\, dt$ by the integrating circuit. A variable resistor VR1 associated with the dial 11 is provided for changing an input voltage ei of the integrating circuit which is applied by a battery E1. A switch RY1 and RY2 of a normal open contact of which the operation associates with relays RY1 and RY2 respectively are provided. A switch S1 is contacted by a signal of injection start. Contacting of the switch S1 energizes the relay RY1 and opening of the switch S1 energizes the RY2 to discharge a potential of the condenser C1. The switch S1 is opened on finishing of one injection molding cycle. The integrating circuit commences to act on contacting of the switch RY1. A battery E3 applying a potential for setting a normal time from a moment of injection start to a moment of occurrence of the peak pressure is provided. The electric potential of the battery E3 is applied respectively to a comparator A2 and A3. A battery E2 applying a potential for setting an allowance range of the normal time is provided. The allowance range for the normal time arbitrarily selectable by a variable resistor VR2 associated with the dial 13. A negative electric potential of the battery E2 is applied to the comparator A2 and also as the electric potential of the battery E2 is inverted by an invertor A10, a positive electric potential is applied to the comparator A3. When the positive electric potential of the output of the integrated circuit is applied to the both comparator A2 and A3, the comparator A2 compares an integrated value eo with an upper limit of the allowance range and the comparator A3 compares the integrated value eo with a lower limit of the allowance range. A voltage meter 10 is provided which indicates a deviation from the normal time. The voltage meter 10 of which the output voltage eo is equal to the voltage of the battery E3 at moment when an indicating needle of the voltage meter 10 indicates zero position on a scale is used in this invention. A pressure transducer 6 is communicated with the hydraulic cylinder chamber 5a and senses the pressure P of it. A differentiating circuit is provided which is composed of a resistor R2, a condenser C2 and an an amplifier A4. An output of the pressure transducer 6 is applied to the differentiating circuit and the pressure P or voltage V is differentiated by time T. When a peak pressure occurrs in the hydraulic cylinder 5a, a differentiaing value dV/dT reaches zero. A variable resistor VR3 is provided which determines a normal potential, zero or a arbitrary negative potential. A comparator A5 is provided which compares the potential of the variable resistor VR3 with the output potential of the differentiating circuit and applies the potential to a logic circuit 16 when the potential of the differentiating circuit exceeding a predetermined potential or $dV/dT=0$ is applied to the comparator A5. A relay RY1 is provided which is deenergized by the output of the logic circuit 16. The deenergizing of the relay RY1 causes a switch RY1 in the integrating circuit to open. When the output potential of the logic circuit 16 and either of output potential of the comparator A2 or A3 are simultaneously applied to the logic circuit 15, the output of the logic circuit 15 energizes a relay RY3. A battery E4 for setting a normal pressure in the cylinder chamber 5a is provided. An electric potential of the battery E4 which is adjustable with a variable resistor VR4 associated with the dial 13 is applied respectively to an adder A6 and A7. A battery E5 applying a potential for setting an allowance range of the normal pressure in the hydraulic cylinder chamber 5a is provided. An electric potential of the battery E5 is adjustable with a variable resistor VR5 associated with the dial 14. A negative electric potential of the battery E5 is applied to the adder A6 and also as the negative electric potential of the battery E5 is inverted by an invertor A12, a positive electric potential is applied to the adder A7. An output potential of the adder A6 determines an upper limit of the allowance range and one of the adder A7 determines a lower limit of it. A comparator A8 and A9 compare an output potential of the pressure transducer 6 with the output potential of the adder A6 for the upper limit and the adder A7 for the lower limit respectively. When the output of the pressure transducer 6 exceeds the upper limit or the lower limit of the allowance range of normal pressure, either of comparator A8 or A9 applies a electric potential to a flip flop 17 or 18. The output of the logic circuit 16 and the output of the comparator A8 or A9 are applied simultaneously to the flip flop 17 or 18, an output of the flip flop circuit 17 or 18 energizes a relay RY4. The mode of operation of the construction according to the invention is as follows:

A time, or voltage eo from a moment of injection start to a moment of occurrence of a peak pressure which is selected by trial and error for finding a desirable molding condition is determined as above mentioned normal time. The normal time is set by adjusting the dial 11 so as to fit the indicating needle of the voltage meter 10 with zero position on the scale of it. The allowance range of the normal time is set by adjusting the dial 12. The pressure in the hydraulic cylinder chamber 5a on occurrence of the peak is set by adjusting the dial 13 and the allowance range of the normal pressure is set by adjusting the dial 14. An injection molding is operated after finishing of above mentioned adjusting. When the time of the peak occurrence is out of the allowance range of the normal time, a monitoring system is operated by energizing of the relay RY3 and also when the pressure in the hydraulic cylinder chamber 5a on the occurrence of the peak pressure is out of the allowance range of the normal time, a monitoring system is operated by energizing of the relay RY4.

What is claimed is:

1. In an injection apparatus having a screw which advances to inject a plasticized charge of material from an injection barrel into a mold cavity and retracts while rotating to accumulate a plasticized charge, an injection apparatus providing a monitoring system comprising a pressure transducer which converts a hydraulic pressure in a hydraulic cylinder for injection into a voltage, a means detecting a peak pressure in the hydraulic cylinder while injecting, a means measuring a time from a moment of injection start to a moment of occurrence of said peak, and a means comparing said peak pressure and said time with a respectively predetermined value.

2. An injection apparatus of claim 1 wherein said means detecting a peak pressure includes a differentiating circuit.

3. An injection apparatus of claim 1 wherein said means measuring a time includes an integrating circuit.

* * * * *